United States Patent [19]
Greene et al.

[11] Patent Number: 5,661,531
[45] Date of Patent: Aug. 26, 1997

[54] TILED, FLAT-PANEL DISPLAY HAVING INVISIBLE SEAMS

[75] Inventors: Ray G. Greene, Ovid; Robert H. Katyl, Vestal; J. Peter Krusius; Che-yu Li, both of Ithaca; Donald P. Seraphim, Vestal; Boris Yost, Ithaca, all of N.Y.

[73] Assignee: Rainbow Displays Inc., Endicott, N.Y.

[21] Appl. No.: 593,759

[22] Filed: Jan. 29, 1996

[51] Int. Cl.⁶ .................................................. G02F 1/1335
[52] U.S. Cl. ................................................................ 349/73
[58] Field of Search ............................. 359/40, 41, 36, 359/82, 83, 80, 67, 53; 349/73, 37, 122, 143, 158

[56] References Cited

U.S. PATENT DOCUMENTS

| | | | |
|---|---|---|---|
| 4,515,440 | 5/1985 | Mosier | 359/83 |
| 5,106,197 | 4/1992 | Ohuchida et al. | 359/88 |
| 5,128,783 | 7/1992 | Abileah et al. | 359/49 |

FOREIGN PATENT DOCUMENTS

| | | | |
|---|---|---|---|
| 5-134252 | 5/1993 | Japan | 359/40 |
| 5-297202 | 11/1993 | Japan | 359/40 |
| 6-95130 | 4/1994 | Japan | 359/80 |

*Primary Examiner*—William L. Sikes
*Assistant Examiner*—James A. Dudek
*Attorney, Agent, or Firm*—Salzman & Levy

[57] ABSTRACT

The present invention features a tiled, substantially flat, panel display having the characteristic of visually imperceptible seams between the tiles for the intended viewing conditions, which include the perception thresholds of the human eye, the view distance, the display brightness and the level of the ambient light. The panel consists of an image source plane having spaced-apart pixels containing light-transmitting elements comprising single or multiple light-valves. These lightvalves transmit monochromatic light, or primary color light spectra, for example, red, green and blue, in gray-scale and color displays, respectively. Each of the pixels is located along the image source plane at a uniform pitch greater than approximately 0.2 mm. Many adjacently-situated tiles are located in a plane in proximity to the image source plane. Secondary light rays can be controlled via light shields, aperture plates, masks and optical elements. The view angles of the tiled display may be further enhanced by using dispersive, optical elements such as microlens arrays. If desired, the brightness of the tiled display can be enhanced by increasing the backlight intensity or the collection of light by using optical, focusing elements such as microlens arrays.

50 Claims, 10 Drawing Sheets

— Neutral
⊓ Bright
⊔ Dark

TILED, FLAT-PANEL DISPLAY HAVING INVISIBLE SEAMS

RELATED APPLICATION

The present patent application is related to U.S. patent application Ser. No. 08/571,208, filed Dec. 12, 1995, for TILED FLAT PANEL DISPLAYS, assigned to the common assignee, and hereby incorporated by reference.

FIELD OF THE INVENTION

The invention pertains to flat-panel electronic displays and, more particularly, large, flat-panel electronic displays that are composed of a plurality of joined, smaller building blocks (tiles), having seams therebetween. Said tiles may be viewed as though they were a single, monolithic display. This invention is comprised of techniques that have been developed for constructing tiled, flat-panel displays in which the seams between the tiles are either visually imperceptible or invisible to the human eye, under normal viewing conditions.

BACKGROUND OF THE INVENTION

Images on electronic displays are derived from an array of small, picture elements known as pixels. In color displays, these pixels comprise three color elements that produce the primary colors, for example, red, blue and green (R, G and B). Usually arranged in rectangular arrays, these pixels can be characterized by a pixel pitch, P, a quantity that measures the spacing of pixels in one direction. A typical cathode-ray tube (CRT) display used for computer applications has a pixel pitch of 0.3 mm. Computer screens have a pixel array width:height ratio of 4:3. Typical, standardized arrays in computer displays are comprised of 640×480, or 1024×768 pixels.

Large displays can be constructed of a plurality of adjacent tiles, with each having a single pixel or an array thereof. Such assembled tiled displays contain visually disturbing seams, resulting from the gaps between adjacent pixels on the same and/or adjacent tiles. Such seams may incorporate interconnect adhesives, seals, mechanical alignment means and other components resulting in visible optical discontinuities in displayed images. Some of these structures are described in the aforementioned patent application Ser. No. 08/571,208. As a consequence, the image portrayed on seamed displays appears segmented and disjointed. Therefore, it is desirable to fabricate tiled, flat-panel displays which do not have noticeable or perceptible seams under the intended viewing conditions.

The pixel pitch in electronic displays must be set so that a continuous image is produced when the display is viewed at distances larger than the minimum viewing distance. For example, with a pixel pitch of P=0.3 mm, the minimum viewing distance is on the order of 1 m. Even though the minimum viewing distance increases in proportion to the pixel pitch, it still limits the pixel pitch for most computer and consumer displays. Since space for the tiling functions must be provided in spaces comparable in size to the pixel pitch, it is difficult to develop structures and methods for constructing tiled displays.

Flat-panel displays (FPD) provide the best choice for constructing "seamless", tiled screens. Flat-panel displays include backlighted and self-lighted displays. Liquid crystal displays (LCDs) are the most common backlighted displays. Flat-panel displays depend on the microfabrication of key components that carry the pixel patterns. Microfabrication techniques are not viable for large displays, due to the fact that the manufacturing yield declines rapidly with increasing area of the display. Therefore, the inventors have determined that small-sized tiles with arrays of pixels can be microfabricated and then assembled together to form a larger electronic display. Past attempts at accomplishing this have still resulted in visible seams, due in large part to the room that is required by tile assembling. The resulting pixel pitch at the edges of tiles was much larger than in the interior of the tiles. This is essentially the reason for the fact that there have only been a few, unsuccessful attempts made to fabricate the large, "seamless", tiled panels.

However, the present invention provides unique designs and methods for achieving such large, "seamless", tiled panels for color or gray-scale displays. This invention particularly focuses on displays of the transparent, lightvalve type. In such displays, light from a uniform, backlight source is transmitted through the display assembly and directly viewed from the front side of the display. The lightvalves control the amount of primary light rays transmitted through each of the color elements in the pixels. The viewer's eyes merge the primary light from the pixels to form a continuous image at a sufficient viewing distance. Because of a number of secondary processes, low-level light emanates from the spaces between the pixels. These phenomena include reflection and light guiding, all of which must be kept to a minimum in order to achieve sufficient brightness and contrast. The gaps between pixels on the same tile, and the gaps between pixels on adjacent tiles have different structures. Consequently, the presence of seams between the pixels at the edge of the tiles will affect both primary and secondary light rays, thus increasing the difficulties for constructing seamless, tiled displays.

The inventors have determined that there are three design principles in making large-scale, "seamless", flat panels that may be viewed as though they were single monolithic displays: (a) the pixel pitch on the tiles must be matched to that of the pixel pitch between the tiles; (b) the primary light paths through the lightvalves must not be affected by the presence of the seam or any other structures or components used in the tile assembly; (c) the inter-pixel gaps must be designed so that intra-tile and inter-tile pixel gaps, which have different physical structures, present approximately the same visual appearance to the viewer under transmitted and reflected light.

SUMMARY OF THE INVENTION

The present invention describes a tiled, substantially flat, panel display having visually imperceptible seams between tiles disposed in an interior portion thereof, so that the display is perceived by a human observer as a single, monolithic display, when viewed at a distance equal or larger than the intended minimum viewing distance. This invention applies primarily to lightvalve-type, flat-panel displays with a backlight. The panel comprises an image source plane having spaced-apart pixels with active areas containing the primary-color, light-transmitting elements, for example, red, green and blue. It should be understood that the primary colors need not be red, green and blue, but may be other colors, and not necessarily limited to three. Included in the image source plane may be a color filter layer. Each of the pixels is disposed along the image source plane at a given pitch approximately greater than 0.2 mm. A plurality of adjacently-disposed tiles are located in the image source plane. The invention includes a number of methods for the design, construction and assembly of tiled displays with invisible seams. These can be grouped into the following distinct categories: (1) alteration of the characteristics of the image source plane, (2) generation of an image view plane distinct from the image source plane, using optical techniques, (3) collimation of light to substantially prevent primary light rays passing through the active areas of the pixels from reaching the seams, (4) suppression of secondary rays emanating from the gaps between the active areas in the pixels, (5) enhancement of the range of view angles presented to the observer by the collimated display, and (6) enhancement of the brightness of the collimated display assembly.

Compared to monolithic AMLCDs, the image source plane is altered so that inter- and intra-tile gaps between the lightvalves have a uniform appearance in transmitted and reflected light. The image view plane is comprised of a number of optical image forming layers, for example, screens, microlens arrays and masks. Collimation of light is accomplished, for example, with apertures and masks placed into the display stack. The view angle distribution can be enhanced via lens arrays, for example. The brightness of the display can be restored by boosting the backlight or increasing light coupling into the lightvalve plane via lens arrays.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENTS

Generally speaking, the present invention features a tiled, flat-panel, color display that is visually "seamless" under the intended viewing conditions. The seams become effectively invisible when they do not produce image segmentation, and their brightness, color and texture appear equal to the gaps between the lightvalves residing on the same tile. The range of perception thresholds for image segmentation and discrimination of brightness and color differences are determined by a human observer, as described in detail below. A number of techniques will be described in the following that affect the design, construction and assembly of the tiled display that make the display appear seamless.

Figure 1:
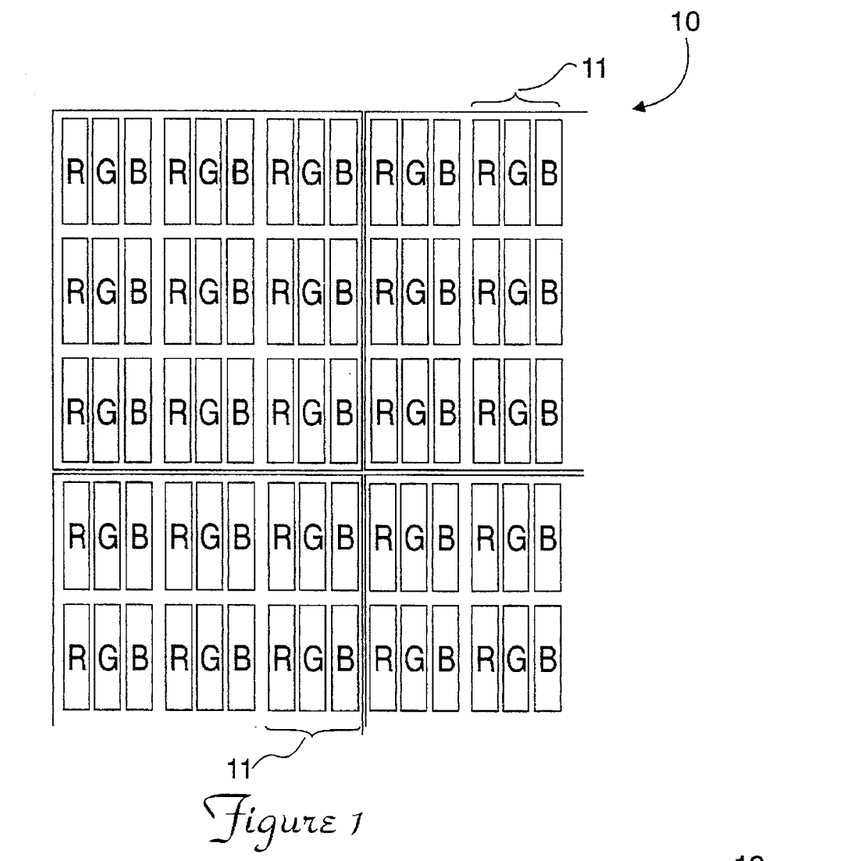
FIG. 1 shows a schematic, plan view of a typical, tiled array of pixels in a color, electronic display, in accordance with this invention.

FIG. 1 shows a schematic, plan view of a typical, tiled display 10 having arrays of pixels 11 arranged into tiles with seams in between. Each of the pixels 11 comprises primary color elements R, G and B (red, green and blue) in the preferred embodiments. The number and selection of the primary colors is not limited to this set, however.

Figure 2:
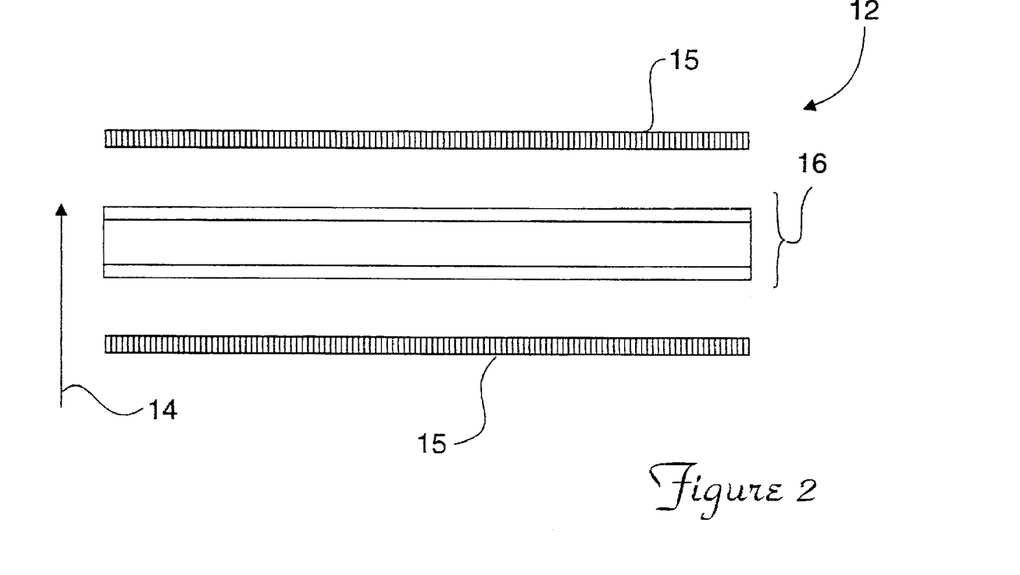
FIG. 2 illustrates a schematic, cross-sectional view of a lightvalve used in a flat-panel display with a backlight.
Figure 3:
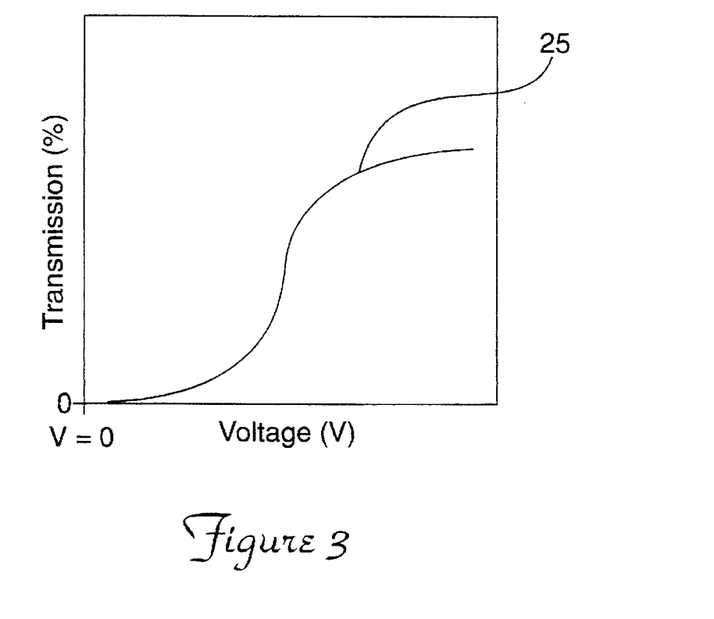
FIG. 3 depicts a graph of a typical light transmission voltage curve for a lightvalve in an active matrix liquid-crystal display.

Referring to FIG. 2, a cross-sectional view of a typical lightvalve 12 used in flat-panel displays is illustrated. For a flat-panel display used in liquid-crystal display (LCD), light is generated in a separate backlight assembly and projected (arrow 14) through the lightvalve 12 towards the viewer. The lightvalve 12 is formed by two polarizer sheets 15 placed on opposite sides of an optically-active liquid-crystal layer 16. Light passing from the backlight through the lower polarizer sheet becomes linearly polarized. When an electric field is applied to the liquid-crystal layer 16, it turns the plane of polarization of the transmitted light 14 by an amount that monotonically increases with the magnitude of the applied electric field. The top polarizer layer lets only the polarization component of the light that is parallel to its polarization plane pass. By varying the magnitude of the applied voltage, the lightvalve 12 will thus modulate the intensity of the transmitted light in a continuous fashion, from fully off to fully on. A typical, light-transmission, applied-voltage curve for LCD materials used in active matrix liquid-crystal displays (AMLCDs) is depicted in FIG. 3.

Figure 4:
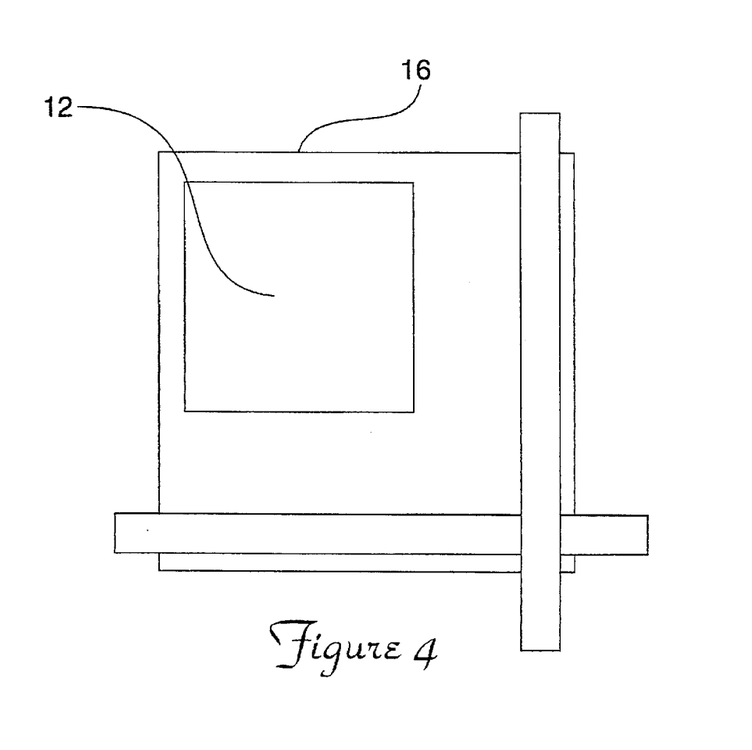
FIG. 4 illustrates a schematic diagram of a grayscale pixel with a single lightvalve, and row and column lines for the selection of the pixel. No devices used for activating the lightvalve have been shown.
Figure 5:
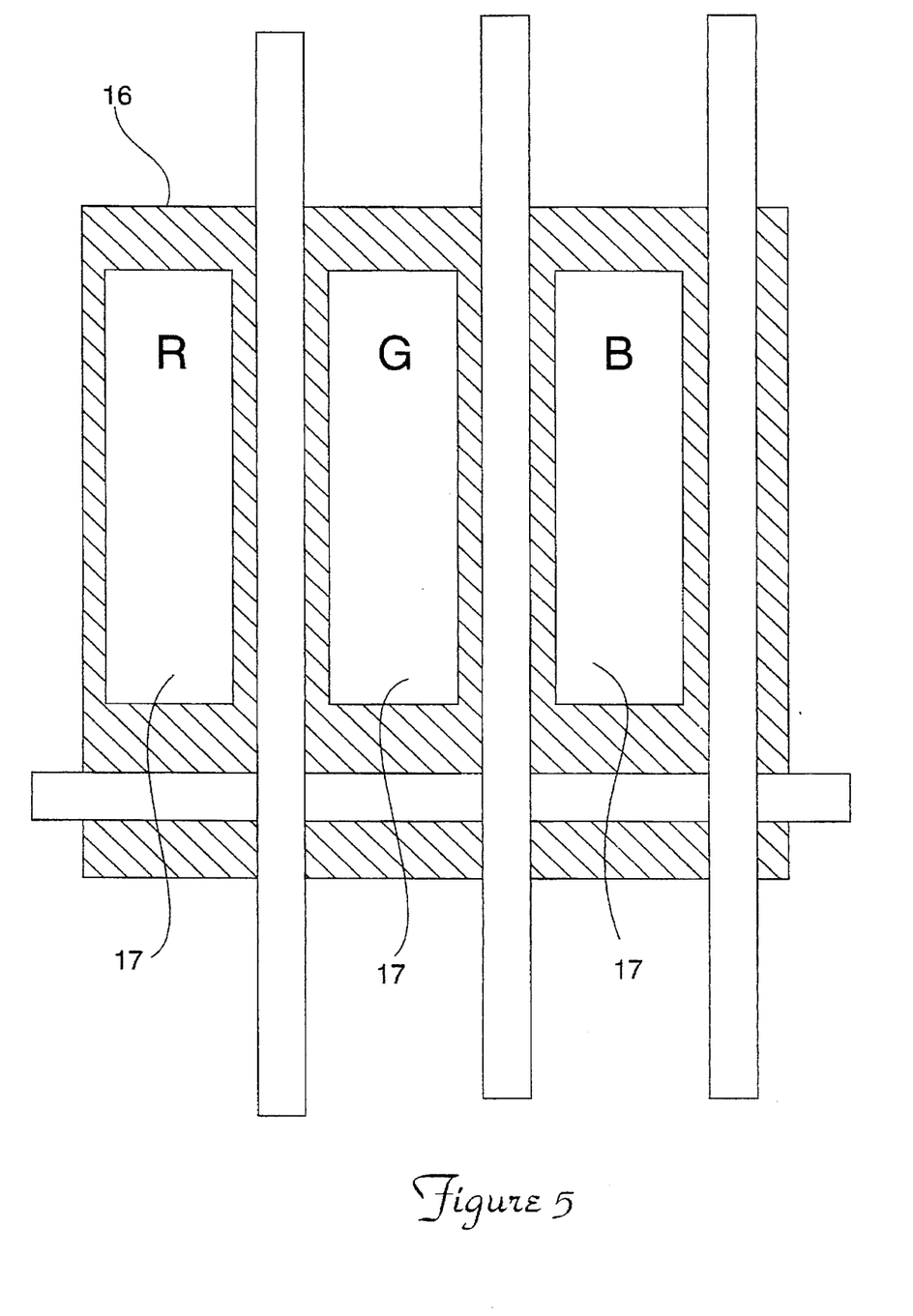
FIG. 5 shows a schematic diagram of a color pixel with three lightvalves, three column lines and one row line for the selection of each color valve. No devices used for activating the lightvalves have been shown.
Figure 6:
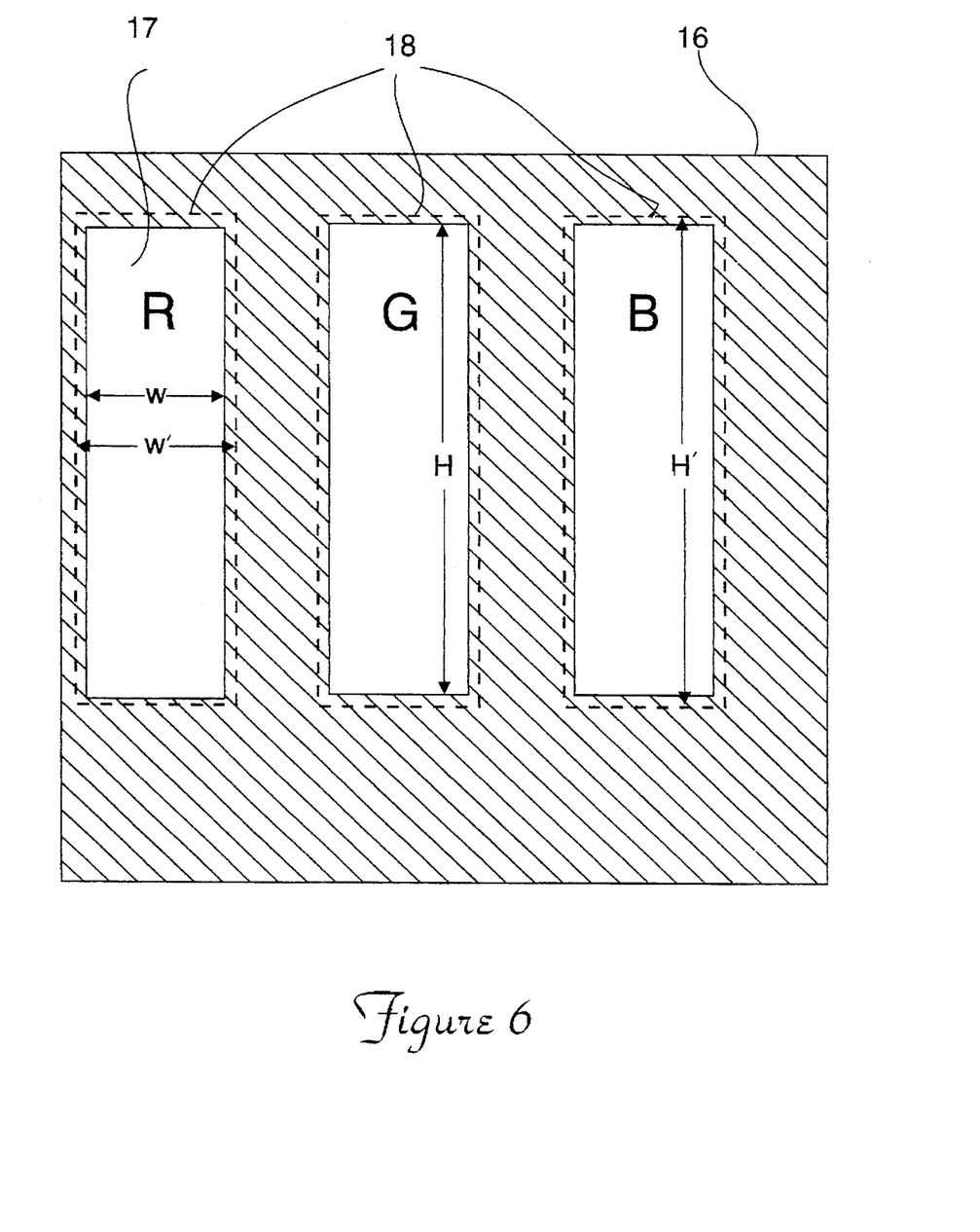
FIG. 6 illustrates the floor plan of a color pixel with three lightvalves and matching color filters.
Figure 6A:
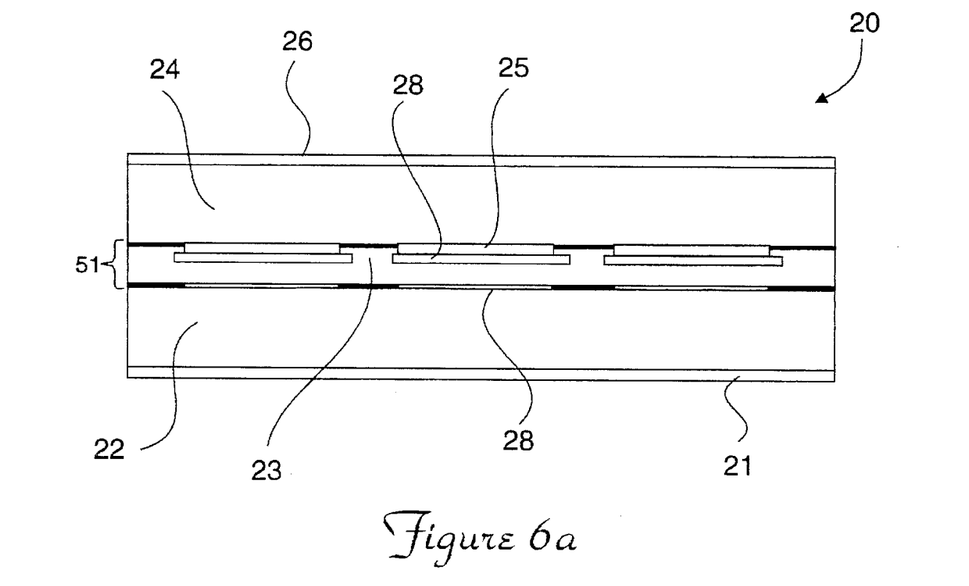
FIG. 6a is a schematic, cross-sectional diagram of a pixel with three lightvalves for an active matrix liquid-crystal color display.

Referring to FIG. 4, a single lightvalve 12 is shown covering a pixel area 16 for gray-scale display applications. In a conventional AMLCD, the lightvalve 12 comprises a thin film transistor (TFT) and a storage capacitor, in addition to the liquid-crystal cell, the transparent electrodes and the polarizers. The TFT is used as the active non-linear device, in combination with row and column lines to achieve matrix addressing of all pixels in the display. In contrast, separately controlled lightvalves 17 are placed in the pixel 16, as shown in FIG. 5, in electronic color displays. One color element is assigned to each of the primary colors. A color filter layer 18, shown in FIG. 6, is placed on top of the lightvalves 17 into the pixel 16. Light having the desired wavelength spectrum corresponding to only one of the color filter 18 regions passes through the lightvalve 17 and the aligned color filter layer 18. The full light-valve assembly 20 is described above, shown in FIG. 6a in cross-section. It consists of a polarizer sheet 21, a glass sheet 22 with thin film structures, including the TFTs on one side, optically-active liquid crystal material 23, another glass sheet 24 with thin film structures, a color filter 25 and another polarizer sheet 26. The lightvalve apertures form the actual image source plane 51 of the display in this assembly. The color filter layer 25 is inserted on the topside of the LCD fill material into close proximity of the image source plane in all conventional LCDs, in order to avoid parallax. Typically, the thickness of the LCD layer is less than 10 µm. However, if collimated or partially collimated light is used, the color filter layer 25 may be located further from the image source plane 51. The typical glass sheet thickness used in LCDs is between 0.7 and 1.1 mm. The glass sheets 22 and 24 carry the transparent electrodes in their thin-film layers and are usually comprising indium-tin-oxide material (ITO) 28. The lower glass plate 22 usually carries the X-Y interconnect for matrix addressing, in addition to the non-linear TFT control devices and the storage capacitors for the lightvalves, for image stabilization. The upper glass sheet 24 carries another transparent electrode and the patterned color filter layer 25.

Figure 7:
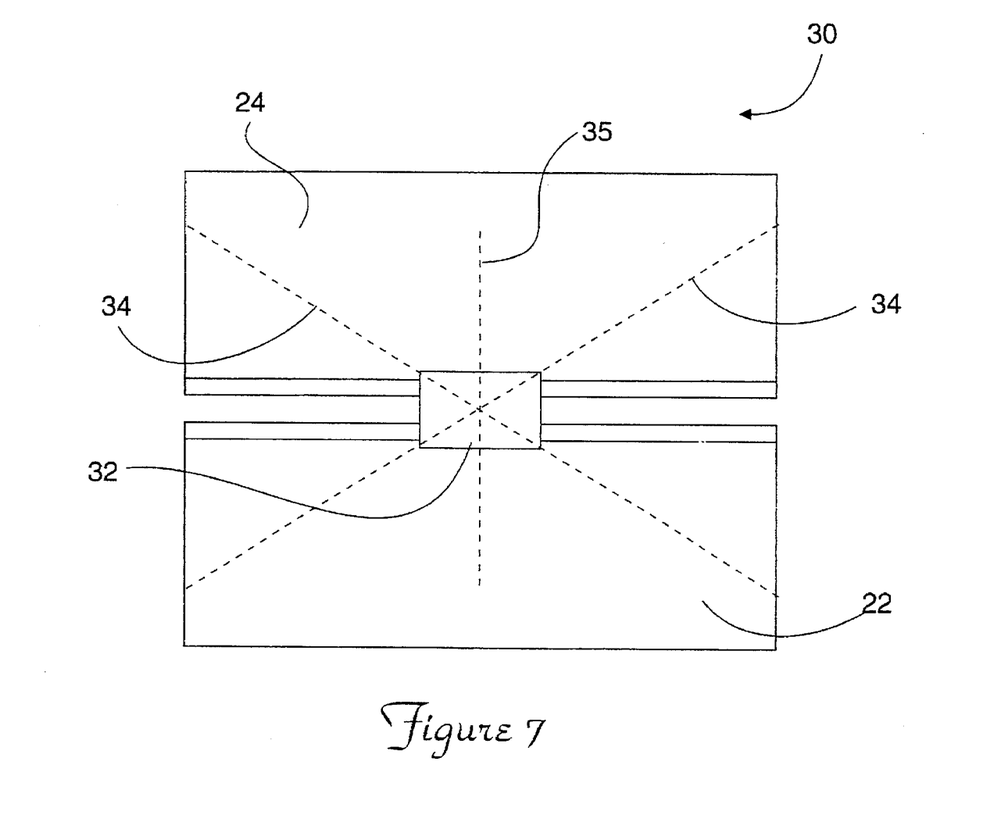
FIG. 7 shows a schematic diagram of rays passing through the lightvalve aperture sandwiched between two glass plates.

Referring to FIG. 7, the cross-section of an active matrix liquid-crystal display stack 30 is shown, along with the limiting rays 34 passing through the light aperture between the two glass plates 22 and 24, respectively. In AMLCDs, the liquid-crystal layer is usually about 5 µm thick. The passage of primary light rays through the lightvalve, flat-panel displays proceeds through the structure shown in FIG. 6. The backlight acts as a diffuse source, with light rays emanating into the full half-space above the source. A fraction of this light passes through the aperture of a lightvalve in a specific pixel defined in the thin film layer 32. Assume that the dimensions of each of the apertures is W×H. The W dimension is somewhat smaller than the pitch P, divided by 3 for color displays (FIG. 6). H is also somewhat smaller than P. A further fraction of this light passes through the second matching aperture defined in the color filter layer 25, with the given dimensions of W'×H', where W'>W, and H'>H, in order to allow for misalignment during assembly. The spacing d between these two apertures is determined by the optical design of the display, with the optical path length through the liquid-crystal layer being the primary factor. The spacing d is always much smaller than W or H and is typically about 5 µm for an AMLCD. As a consequence of the very small aspect ratio d:W, a very wide, angular range of light rays can pass through the display stack 30. For a conventional AMLCD with P=300 µm, W=75 µm and d=5 µm, the limiting rays 34 form angles of 86.2° with the surface normal 35 of the display. Therefore, light normally spreads in the top glass plate 24 over a wide lateral distance, overlapping several other pixels. Only an angle of 15.2° of the surface normal 35 is required for a 1.1 mm-thick top plate 24 for the light to reach the adjacent pixel with the above, sample parameters (lateral offset of P).

In addition to these two apertures, reflection and refraction processes take place at each optical interface where the refractive index changes or a reflective material is encountered. For a glass-to-air interface, with refractive indices of 1.5 and 1.0, for example, the angle for total internal reflection is 56.3°. Therefore, the limiting primary rays escaping from the display stack 30 towards the viewer are not limited by the aspect ratio of the aperture, but by total internal reflection. Nevertheless, the permissible angles for the limiting rays are much larger than the angle required to overlap the adjacent pixel.

A large number of secondary light rays traverse in the transparent glass stack, in addition to the primary rays originating from the backlight and passing through the lightvalves. When diffuse light emanating from the backlight is passed through the glass stack 30, it undergoes optical refraction and reflection processes, including lateral reflective and refractive waveguiding. These processes redistribute the secondary rays in the glass stack, so that some light is transmitted through all points of the display outside the primary rays controlled by the lightvalve apertures. Secondary rays, in combination with ambient light entering the display from the top surface, form background light that influences the contrast of the display. In order to maximize the contrast, the intensity of secondary rays must be minimized. Contrast ratios as large as 100:1 have been demonstrated in state-of-the-art AMLCDs.

Figure 8:
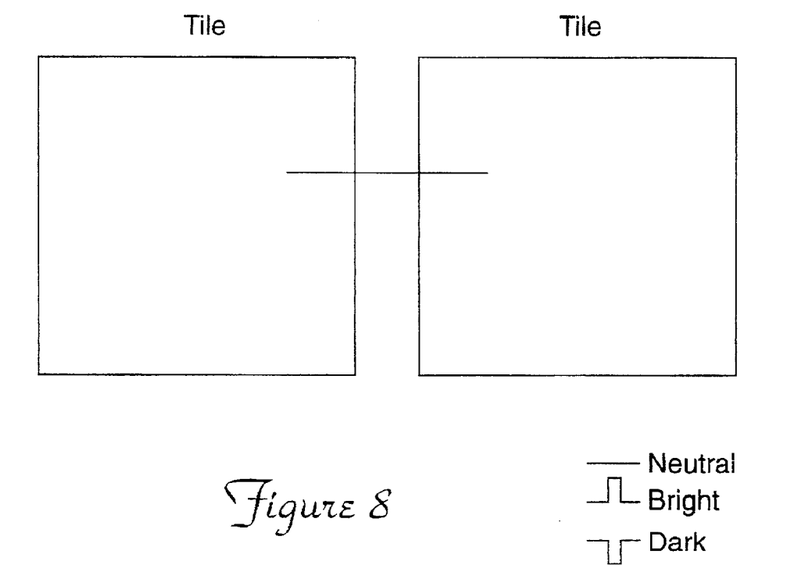
FIG. 8 illustrates a schematic diagram of the modulation of light intensity around a seam between two tiles.

Monolithic displays are laterally uniform, and secondary light does not pose any special optical problems, apart from the edge pixels that can be extended and covered over. In tiled displays, however, the situation is completely different. The structure abruptly changes at the seam of each tile. Therefore, both primary and secondary rays are affected by the presence of a seam, and any seam will generally be visible unless it is significantly modified. The visibility of the seam can be rigorously demonstrated using the following model. Assume that the brightness of two adjacent tiles is the same, but undergoes an offset at the seam, as shown in FIG. 8. By performing a Fourier analysis of the resulting light intensity profile, and relating this to the resolving power of the human eye, the following equation for the threshold width θ of the seam, under high illumination conditions (500 nit or cd/m$^2$), is:

$$\theta = 3.5(\Delta I/I) \text{ arc sec,} \quad (1)$$

where ΔI/I is the relative intensity modulation at the seam. (Alphonse, G. A. and Lubin, J., "Psychophysical Requirements for Tiled Large Screen Displays", SPIE Vol. 1664, *High Resolution Displays and Projection Systems*, 1992). Equation 1 has been confirmed by psychophysical testing, showing that both bright and dark seams are equally visible. For a relative intensity modulation of 1 or 100%, at a viewing distance of 50 cm, Equation 1 shows that the maximum width for an invisible seam is 8.5 µm for this intensity modulation. Since tiling functions cannot easily be accomplished in 8.5 µm seam widths today, tiled displays cannot be constructed without special designs that drastically reduce the intensity modulation at the seam.

The techniques presented in this invention for designing, constructing and assembling tiled displays with invisible seams can be grouped into the following six distinct categories, which will be described in the following in detail.

(1) alteration of the image plane, (2) generation of an image view plane apart from the image source plane, (3) collimation, or partial collimation, of light to prevent primary light rays from reaching the seams, (4) suppression of secondary rays emanating from the gaps between the lightvalves in the pixels, (5) enhancement of the range of view angles presented to the observer by the tiled display, and (6) enhancement of the brightness of the tiled display assembly.

Image Source Plane

The image source plane of a tiled display is preferably altered, so that it appears as a uniform array of pixels with a constant pixel pitch, both in transmitted and reflected light, irrespective of the presence of the seams. First, all physical space required by tiling must, therefore, fit into the space provided by the uniform pixel pitch. For LCDs, the seam must accommodate two liquid-crystal seals and possibly the metal interconnect for the matrix addressing of each pixel. This requirement limits the achievable minimum pixel pitch in tiled displays. Second, the gap between lightvalves on adjacent tiles must be made to appear the same optically as the pixel gaps on the same tile. This can be accomplished by placing light shields into the image source plane between adjacent lightvalves. The non-transparent, thin film materials used for making the TFT device interconnect can be used for light shielding on the tile. A separate light shield layer is preferably placed into the gap between adjacent tiles to block direct light rays from passing through the gap. This light shield can be integrated into the tile interconnect structures described in the aforementioned, related U.S. patent application, Ser. No. 08/571,208. Finally, the front side optical reflectivity of all light shield layers placed into the gaps between lightvalves should be as uniform as possible.

Generation of Image View Plane

The image source plane in a flat-panel LCD is formed by the lightvalve apertures in the thin film layer underneath the optically-active liquid-crystal layer. For practical purposes, the color filter can be considered to reside in the image source plane as well, since the thickness of the liquid-crystal layer is only on the order of 5 µm. Even with the state-of-the-art, high-resolution pixel pitch of 0.2 mm, this gives a height-to-width aspect ratio of 0.075 for the color elements, which produces a negligible parallax error for normal viewing conditions. However, if mask layers or aperture plates are used on the top surface of the thinnest-available, upper glass sheet with a thickness of 0.7 mm, the height-to-width aspect ratio with the same pixel pitch will increase to 16.5. This will result in an unacceptably large parallax error, unless the image source plane is viewed close to the direction of the surface normal. In order to avoid this parallax problem, the image source plane must be projected into a separate image view plane, which must be generated from the image source plane using a number of well-known optical techniques. First, the seams are hidden from direct view by placing a facemask on either side of the common coverplate over all seams. It may be desirable to cover the gaps between the lightvalves on the same tiles, as well, with the same face mask, in order to match the light reflection characteristics with those of the seam gaps, and in order to control secondary rays, as described later in this section. Second, optical elements can be used to perform the actual forward projection of the image. A number of optical techniques, including, but not limited to, arrays of refractive microlenses, holographic lenses, diffusive screens, lenticular screens and Fresnel screens can be used to perform the projection. These optical techniques can be designed to meet or exceed the view angle requirements typically set on state-of-the-art AMLCDs. Since the image quality of the tiled display depends on this projection, care must be taken to maintain a uniform focus and contrast over the entire area of the display.

Collimation of Primary Rays

Figure 9:
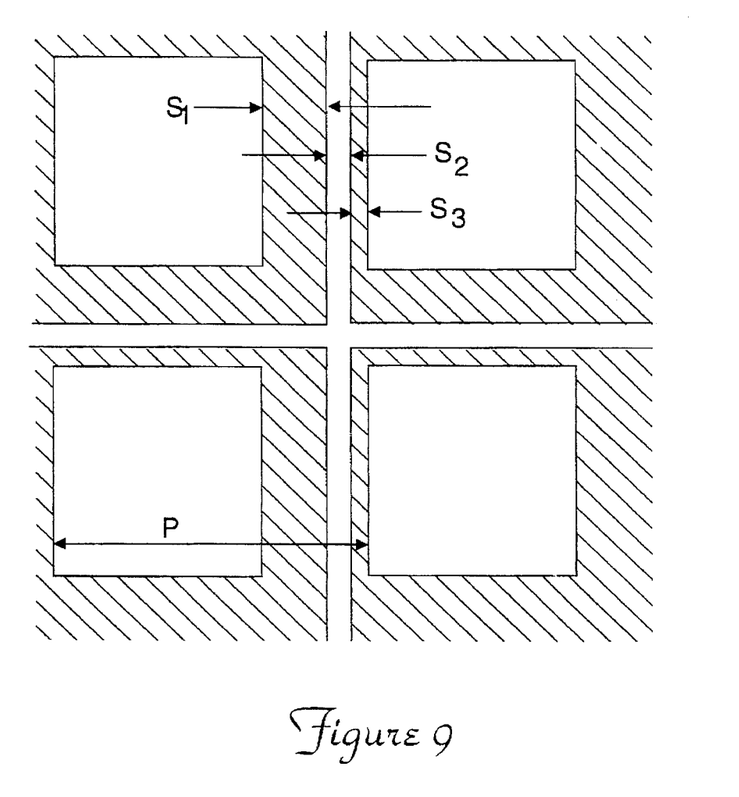
FIG. 9 depicts a floor plan view at the corners of four display tiles, with the seam region between the lightvalves on adjacent tiles shown in closer detail.

The primary rays should preferably be limited, so that they do not pass through any structures used for tiling, when passing through lightvalves, adjacent or close to the seams. Assume that the tiling functions require a width of S, from the full pixel pitch P, as shown in FIG. 9. Note that S denotes the full spacing between two lightvalve apertures on adjacent titles. The spacing S can further be partitioned into separate components $S_1$, $S_2$ and $S_3$, corresponding to the physical structures in the seam. $S_1$ and $S_3$ denote the spacing from the edge of lightvalve apertures to the edge of glass plates on both sides of the gap (width $S_2$). $S_1$ and $S_2$ may be different, depending upon where the tiling functions are placed. It follows, therefore, that the outermost, primary rays should be limited, so that they leave the glass stack 30 without crossing into the gap region $S_2$ at the upper surface of the top glass plate 24 of the tile.

Figure 10:
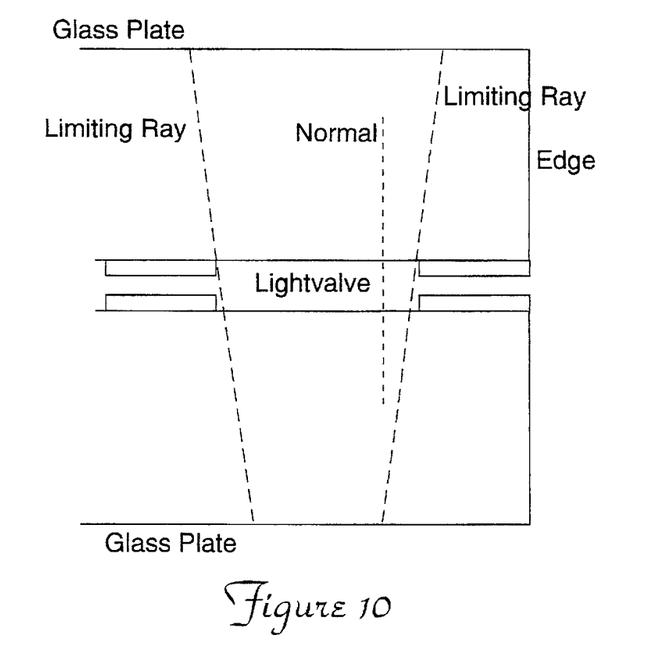
FIG. 10 shows a schematic diagram of a lightvalve at the edge of a tile, with limiting primary rays.

Consider the following example as an illustration. Assume a gray-scale AMLCD with a pixel pitch of P=1 mm, a lightvalve aperture width W=600 µm, a tiling allocation of S=400 µm and a glass plate thickness of t=1.1 mm. Choose $S_1$=150 µm, $S_2$=100 µm and $S_3$=150 µm in this illustration. Then, the outermost rays are preferably limited to an angle of arctan (150/1100)=7.76° from the surface normal. This ray geometry is illustrated in FIG. 10. A similar computation, with a similar result, can be shown for a color AMLCD display. Primary rays in a tiled display should be collimated to a ray envelope limited by the aspect ratio of the lightvalve apertures and total internal reflection.

Figure 11:
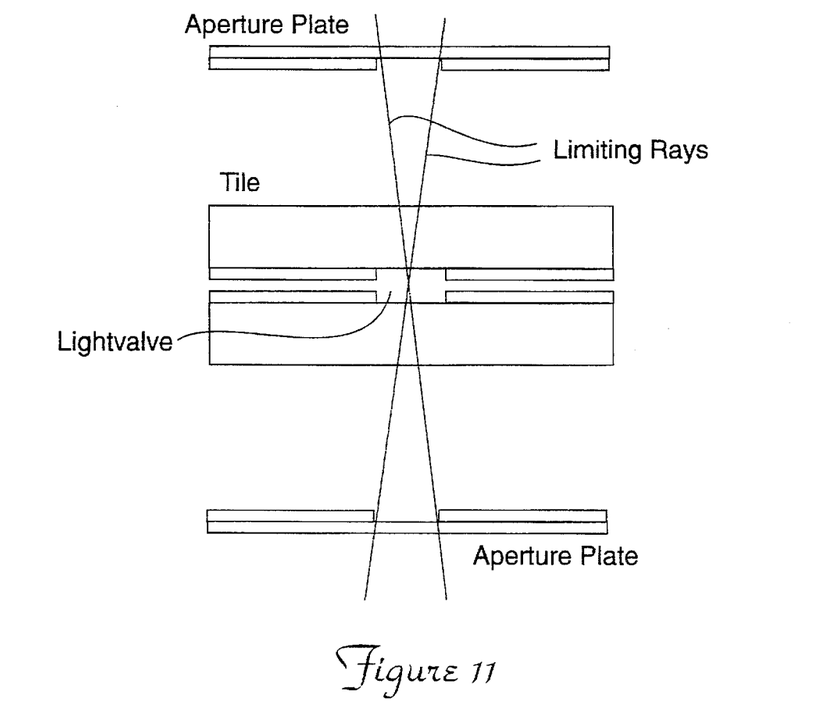
FIG. 11 illustrates a schematic diagram of aperture plates for limiting primary rays passing through a lightvalve.

Partial light collimation can be accomplished in several ways. A single aperture plate, or multiple aperture plates, can be inserted between the display tile and the backlight. Apertures can be implemented, for example, in metal screens similar to shadow masks used in CRTs, or alternately, on non-transparent, thin film layers on other glass plates used in the assembly of the tiled display, as shown in FIG. 11. These additional glass plates are described in the related U.S. patent application Ser. No. 08/571,708. Other optical elements, including, but not limited to, refractive or holographic lenses, screens and microchannel collimation plates, can be inserted between the backlight and each lightvalve in order to achieve partial light collimation. Lenses can be fabricated as two-dimensional microlens arrays that replicate the lightvalve pattern, which can be accomplished by pressing in a separate plastic sheet or etching the patterns into a separate glass plate. In addition to the collimation of primary rays, the optical elements described in this section will help to suppress secondary rays and enhance image contrast and focus.

Suppression of Secondary Rays

Secondary rays can originate either from the backside or frontside of the display. Backside secondary rays emanate from the backlight and undergo a number of refractive and reflective processes. Ambient light provides the source for frontside secondary rays. Secondary rays have complex and essentially unpredictable paths in the display stack. In addition to the uncertainty of their behavior, additional optical phenomena occur in the structures that are tiled, such as reflection and refraction at the edges of the glass plates forming the display tiles; blockage of light rays in the seal materials; line-of-sight transmission of light rays through the gap between the tiles; and waveguiding of light through the gap between the tiles. In order to minimize the intensity modulation at the seams, the inter-pixel spaces between the pixels in the interior of the tiles and at the edges of the tiles should preferably be made similar, from the optical point of view.

The secondary-ray effects can be managed using the following techniques: (a) inserting light shields in the light-valve layers (thin film or color filter levels) to block all rays outside the primary-ray envelopes in the image source plane; (b) inserting light shields into the gap between each adjacent tile surrounding each tile from all four sides; (c) inserting further light shields into the regions on the tiles that are used for interconnect functions at the edges thereof; (d) inserting further non-transparent regions into the outer, light-shield layers used for light collimation, so as to block direct rays from passing through the display stack regions between lightvalves on the tiles or in the seams; (e) preparing the edges of tiles to well-defined optical characteristics to influence edge-scattering of light, for example, by making them fully transmissive, fully reflective or diffusive; (f) filling the gap between upper plates of the tiles with an index-matching, optically-transparent compound; (g) inserting a face plate pattern on the bottom surface of the cover plate, with opaque patterns above all regions not overlapping lightvalves in the image view plane, whether on the tiles or atop the seams therebetween; and (h) inserting light shields into the areas used for interconnection on the backplate or on tile carriers described in the aforementioned related patent application, Ser. No. 08/571,208.

Techniques in (a) block direct light rays from passing through the regions between the lightvalves in the image source layer. The technique (b) is preferably used in order to block line-of-sight rays from passing up through the gap between the two vertical faces of the tile plates, and to match the gap light transmission with that of the spaces between the lightvalves on the tiles. If desired, the light shields can be integrated into the interconnect structures that are used for row and column lines in matrix addressing. Technique (c) is also needed to match the optical transmission characteristics of the interconnect areas to the gaps between lightvalves in the interior of the tiles. The addition of matching light shields in (d) is effective both for the partial collimation of primary rays and the blockage of stray light rays. The need for technique (e) depends upon the optical quality of the edges of the tile glass plates. Scribing and cleaving, the usual way of cutting the tiles from larger sheets of glass, produces a near optical-quality surface that has a residual surface topology of more than several micrometers. Glass surfaces cut with a rotating diamond wheel are topologically smooth, but often have a "milky" visual appearance, because of a fine surface roughness that depends on the grit size of the wheel. In either case, additional optical preparation of the edge of the glass can be performed, if required, using well-known techniques. The technique in (f) facilitates the lateral transport of optical energy associated with the secondary rays across the gap between the tiles above the image source plane, in a fashion similar to that atop pixel gaps on top of the tiles. Finally, technique (g) is required to match the front surface reflectivities of seam regions with those between the lightvalves on the tiles, primarily for ambient light.

View Angle Enhancement of Tiled Display

Figure 12:
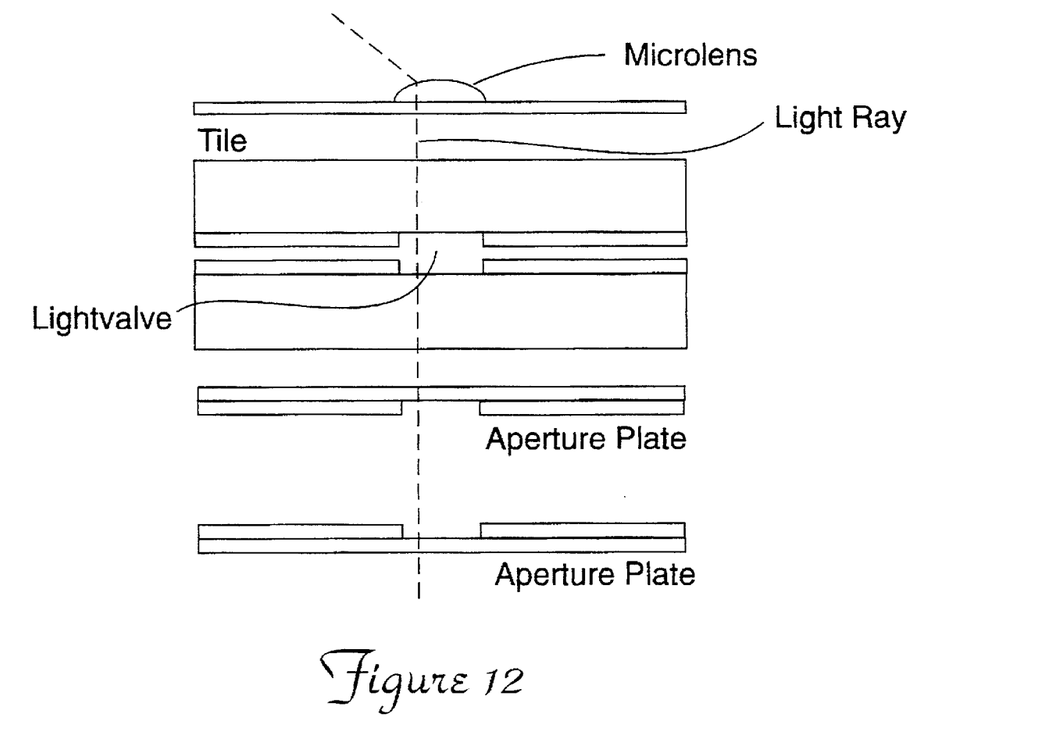
FIG. 12 shows a microlens array attached to the cover plate, in order to project the image plane into the view plane and to expand the view angles.

While collimation, or partial collimation, helps to focus primary light rays into channels passing through the lightvalves, it limits the front side viewing angles to a rather small, solid angle from the surface normal. In contrast, single-user electronic displays often are required to sustain a viewing angle distribution of ±30° and multi-user displays of up to ±60° from the surface normal. Therefore, the view angle distribution limited by collimation may be enhanced, depending on the intended application. This can be accomplished by inserting an array of lenses or a dispersive screen into the view plane. The lens array may consist of refractive microlenses or holographic microlenses, and it can be made using microfabrication techniques. The lens array or screen may reside on a separate transparent plate or, alternatively, it can be integrated into one of the existing glass sheets used in the tiles or the cover plate. The embodiment of a microlens array on a separate cover plate is illustrated in FIG. 12.

Brightness Enhancement of Tiled Display

The second problem arising from collimation, or partial collimation, of the primary rays is that collimation tends to limit the amount of light collected by each lightvalve and consequently reduces the brightness of the display. For example, if aperture plates are used for collimation, the total light flux will be reduced in proportion to the aperture ratio of the light-shield facing the backlight source. Since reduced-brightness displays require low ambient light viewing conditions, the brightness may have to be enhanced. This can be done in several different ways. The intensity of the backlight source itself can be increased by boosting the electrical energy input or by using a larger number of light sources and/or reflective light concentrators. Alternatively, the efficiency for collecting the backlight into the collimated light channels can be increased by using microlens or holographic lens arrays, or other optical devices. These optical elements can be placed between the backlight source and the image plane of the display.

This invention covers all techniques discussed above, and all of their combinations, for designing, constructing and assembling seamless, tiled, flat-panel displays. Which of these techniques, or combination thereof, are used for a given, tiled display will depend on the aperture ratio, the fraction of the pixel pitch allocated for tiling functions, the assembly techniques, the specifications of the display and the viewing conditions. In order to clarify such combinations, two specific, preferred embodiments of the invention will be described in detail in the following. The first of these specific, preferred embodiments employs those techniques of the invention that result in structures between the image plane and the viewer, in order to make seams invisible. This embodiment is useful for tiled displays with a smaller view-plane-to-image-plane distance and pixel pitch ratio. The second, specific, preferred embodiment employs concepts that allow the placement of structures both in front of and behind the view plane, in order to make the seams appear invisible, under normal viewing conditions intended for the tiled display. The second embodiment is useful for tiled displays having larger viewing angles and a medium-to-large view-plane-to-image-plane distance and pixel pitch ratio.

Figure 13:
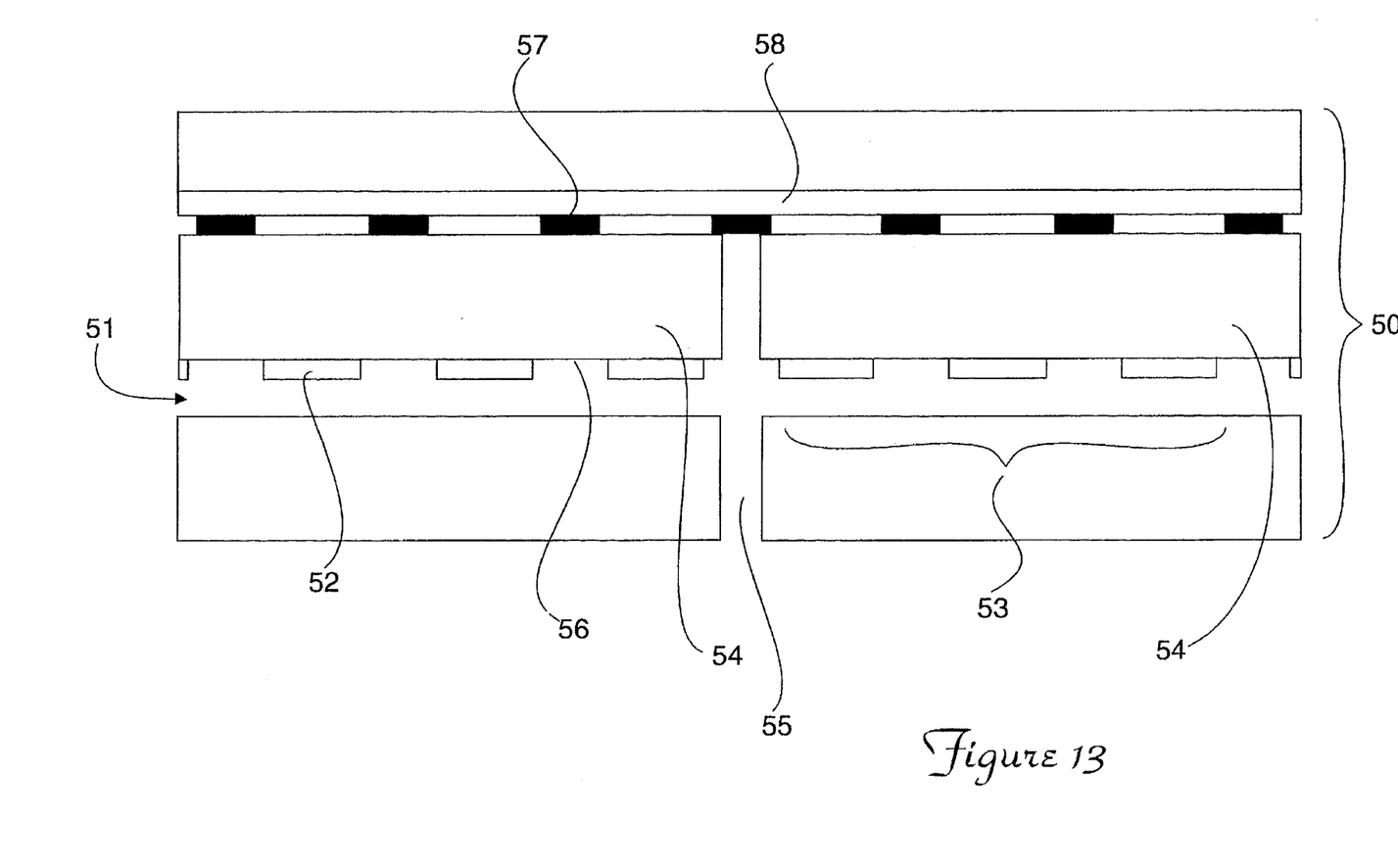
FIG. 13 shows a schematic, cross-sectional view of the first, preferred embodiment of a tiled, color display having invisible seams in accordance with the invention.

Now referring to FIG. 13, the first of the specific, preferred embodiments of the seamless, tiled display of this invention is illustrated in cross-sectional view. The seamless display 50 comprises an image source plane 51 comprising a color filter layer 52 and lightvalve layers aperture areas 53. It should be understood that the image source plane 51 can be disposed anywhere between the viewer and the source. The tiles are presented by the glass layers 54, which are separated by a gap 55. This gap 55 and the areas between the lightvalves areas 56 are covered by a mask 57, in order to make the image source plane uniform. An overlaid screen surface 58 is used to project the image source plane into the image view plane. A lens surface may be used, instead of the screen surface 58, for the generation of the image view plane.

When the seam 55 is blocked from the backlight source, the seam will still be noticeably visible because of ambient light and scattered light from the sides of the tiles. However, when the seam 55 is blocked directly from above, using a mask 57, which is aligned to the tiles and lightvalves of the display, then the seam will not be perceptible when it is viewed directly along the surface normal. However, for sufficiently large viewing angles away from the surface normal, the seam 55 will no longer be shadowed by the mask 57, and thus becomes visible. If the view angle range for seamless appearance is unacceptably small, it can be enhanced through the use of a microlens array as discussed above. The closer the screen 58 can be placed to the mask 57, the larger the view angle range becomes for seamless appearance. The mask reduces the transmitted light flux significantly. A thin polarizer layer 59 can be placed between the image source plane 51 and the screen 58.

In order to form an acceptable image, the brightness and the focus of the display must also be sufficient. This requirement is accomplished by (a) making the distance from the image source plane 51 to the image view plane small, or less than the pixel pitch of the lightvalve apertures 53, and preferably within one order of magnitude of that of the pixel pitch of the lightvalve apertures 53; and (b) constructing an image source intensity distribution to not be strongly diverging. Both of the aforementioned conditions (a) and (b) can be easily met with the AMLCD structure.

Figure 14:
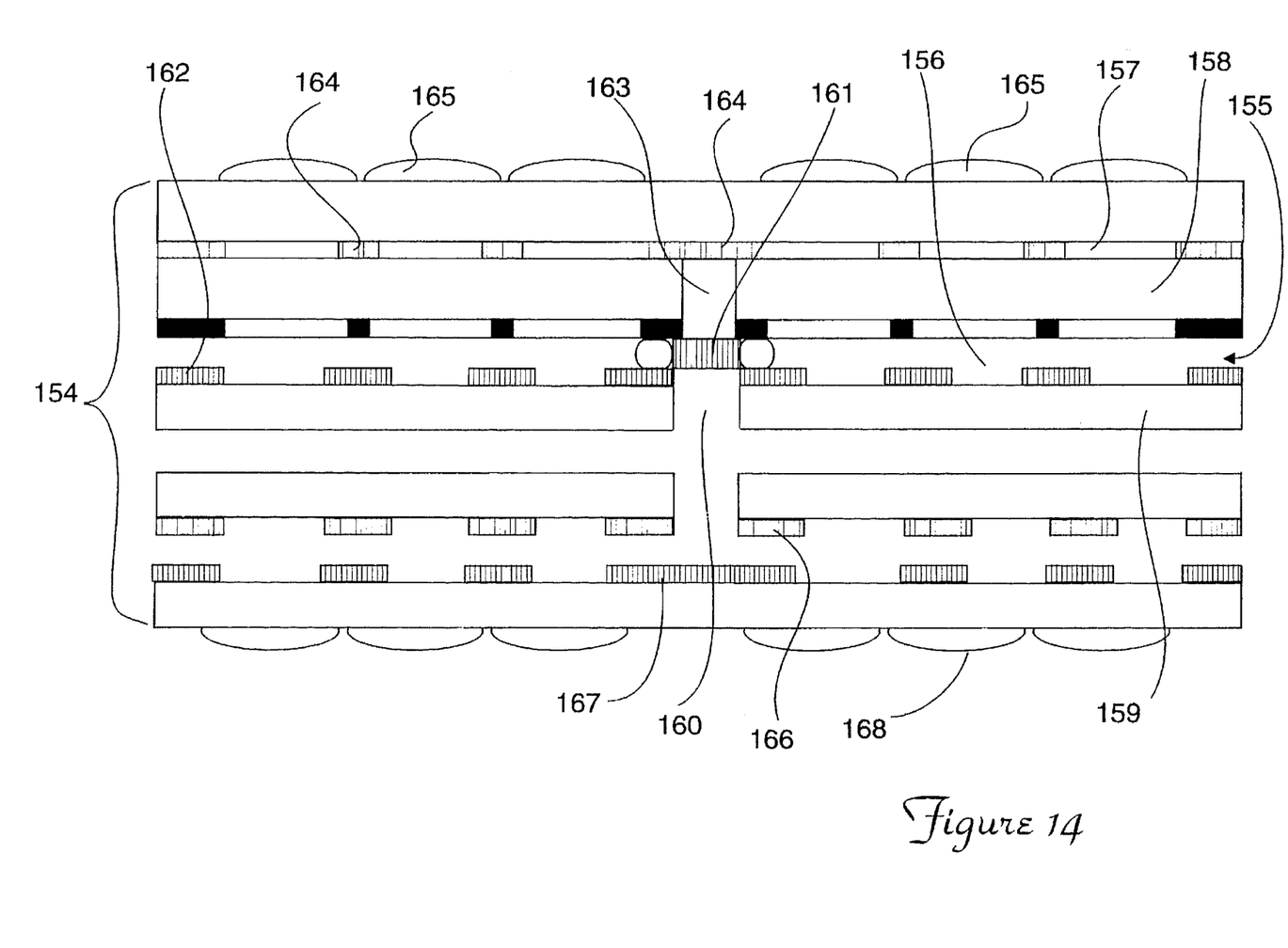
FIG. 14 depicts a schematic, cross-sectional view of the second preferred embodiment of a tiled, transparent, lightvalve-based, color display having invisible seams.

The second, specific, preferred embodiment of the seamless, tiled display of this invention is illustrated in cross-sectional view in FIG. 14. The seamless display 154 comprises an image source plane 155 composed of a lightvalve aperture layer 156 and a color filter layer 157 in close proximity. The tiles are formed by the top and bottom glass layers 158 and 159, respectively. The inter-tile gap 160 is covered by an inserted light-shield layer 161 and the intra-tile pixel gaps are covered by an opaque, thin-film, light-shield layer 162. The gap between the top glass sheets forming two adjacent tiles is filled with a transparent material 163 having an optical refractive index matched to that of the glass tiles. A light-blocking mask layer 164 covers all lightvalve gaps between adjacent pixels, whether they be inter- or intra-tile gaps. This gives the seam regions the same appearance in reflected light as the lightvalve gaps on the tiles. A microlens array 165 is placed on top of the glass cover plate, or it is integrated thereinto. The microlens array generates the image view plane and enhances the view angle distribution. Light-shield layers 166 and 167 (for partially collimating the light emanating from the diffuse backlight assembly) are placed onto several surfaces of the glass display stack. The amount of light collimation can be controlled by shaping and sizing the apertures in the light-shield layers so that the divergence of the rays passing through the image plane produces the desired view-plane characteristics. The spacing of the lightshields from the image plane also affects the light-ray distributions; they are chosen so that the desired degree of collimation is achieved. Because of the collimation of the light, the color filter layer can be moved out of the image source plane, if desired, and can be further away within the display stack. A microlens array 168 for focusing light rays from the diffuse backlight assembly into the partially collimating light apertures of the display stack has been attached to, or integrated into, the lower surface of the bottom glass plate facing the light source, in order to boost the brightness of the display.

Since other combinations, modifications and changes varied to fit particular operating requirements and environments will be apparent to those skilled in the art, the invention is not considered limited to the chosen preferred embodiments for purposes of this disclosure, but covers all changes and modifications which do not constitute departures from the true spirit and scope of this invention.

Having thus described the invention, what is desired to be protected by Letters Patent is presented in the subsequently appended claims.

What is claimed is:

1. A tiled, substantially flat, panel display composed of a plurality of joined, smaller tiles, having the characteristic of visually imperceptible seams between tiles disposed in an interior portion thereof, such that said panel display can be viewed as though it were a single, monolithic display, comprising:

a) means defining an image source plane having spaced-apart, pixel-active areas, with each of said pixel-active areas being disposed along said image source plane at a given pitch distance;

b) a plurality of adjacently disposed tiles, each having a predetermined thickness, disposed in a plane adjacent said image source plane;

c) means defining seams disposed between adjacent tiles;

d) masking means in conjunction with light collimating means, said masking means being proximate said seams for blocking direct and selectively scattered light from said seams towards a viewer of said display, thereby rendering said seams substantially visually imperceptible to said viewer, notwithstanding any angle at which said display is viewed thereby; and e) means defining a viewing plane adjacent said masking means for transmitting light from said image source plane to said viewer, with substantially no light from said seams.

2. The tiled, substantially flat, panel display in accordance with claim 1, wherein said tiles comprise an upper and a lower layer each having a predetermined thickness, and said distance from said image source plane to said viewing plane is between approximately the geometrical mean of said thicknesses of said layers and one order of magnitude greater than said given distance of said spaced-apart pixel-active areas.

3. The tiled, substantially flat, panel display in accordance with claim 1, wherein said viewing plane comprises a lens layer.

4. The tiled, substantially flat, panel display in accordance with claim 1, wherein said viewing plane comprises a screen layer.

5. The tiled, substantially flat, panel display in accordance with claim 1, further comprising a color filter layer.

6. The tiled, substantially flat, panel display in accordance with claim 1, wherein each of said pixel-active areas comprises a group of primary color elements.

7. The tiled, substantially flat, panel display in accordance with claim 1, wherein said image source plane comprises a substantially non-diverging, light-intensity distribution characteristic.

8. The tiled, substantially flat, panel display in accordance with claim 1, further comprising at least two polarizing layers, one of said polarizing layers being disposed between said image source plane and the viewing plane.

9. The tiled, substantially flat, panel display in accordance with claim 2, wherein said pitch distance of pixel-active areas is greater than approximately 0.2 mm.

10. The tiled, substantially flat, panel display in accordance with claim 2, wherein said distance from said image source plane to said viewing plans is less than approximately five times said tile thickness.

11. The tiled, substantially flat, display panel in accordance with claim 1, wherein said masking means comprises light-shielding material disposed in said image source plane.

12. The tiled, substantially flat, display panel in accordance with claim 1, wherein said masking means comprises light-shielding material disposed above said image source plane.

13. The tiled, substantially flat, display panel in accordance with claim 1, wherein said masking means comprises light-shielding material disposed below said image source plane, so that additional light collimation is provided along predetermined channels.

14. The tiled, substantially flat, display panel in accordance with claim 1, wherein said masking means comprises light-shielding material disposed within said seams.

15. The tiled, substantially flat, panel display in accordance with claim 1, further comprising:

f) a compound disposed in said seams, having optical properties that are substantially similar to the optical properties of said tiles.

16. The tiled, substantially flat, panel display in a accordance with claim 1, further comprising:

f) a plurality of light-directing means disposed proximate at least one of said planes for eliminating superfluous secondary light paths from said viewing plane.

17. The tiled, substantially flat, panel display in accordance with claim 1, further comprising:

f) a base plate for supporting said planes, said tiles and said masking means, and for providing an electrical, optical and mechanical interface.

18. The tiled, substantially flat, panel display in accordance with claim 17, further comprising:

g) a tile carrier for supporting said tiles.

19. The tiled, substantially flat, panel display in accordance with claim 18, further comprising:

h) a plurality of focusing devices for coupling light into said image source plane.

20. The tiled, substantially flat, panel display in accordance with claim 19, wherein said plurality of focusing devices comprises any one of the group comprising refractive microlenses, off-axis lenses and holographic lens devices.

21. The tiled, substantially flat, panel display in accordance with claim 13, further comprising f) a plurality of focusing devices for coupling light in said predetermined collimating channels.

22. The tiled, substantially flat, panel display in accordance with claim 19, wherein said plurality of focusing devices is integrated into said substantially flat, panel display.

23. The tiled, substantially flat, panel display in accordance with claim 1, wherein said masking means and said viewing plane comprise a single, integrated structure.

24. The tiled, substantially flat, panel display in accordance with claim 1, further comprising an anti-reflective coating.

25. The tiled, substantially flat, panel display in accordance with claim 1, wherein at least one of said pixel-active areas is dimensionally non-identical to the others of said pixel-active areas.

26. A tiled, substantially flat, panel display composed of a plurality of joined, smaller tiles, having the characteristic of a visually imperceptible seam, such that said panel display can be viewed as though it were a single, monolithic display, comprising:

a) means defining an image source plane having spaced-apart, pixel-active areas;

b) a plurality of tiles disposed in a plane adjacent said image source plane;

c) means defining a seam disposed between adjacently disposed tiles;

d) masking means in conjunction with light collimating means, said masking means being disposed proximate said seam for blocking direct and selectively scattered light directed from said seam towards a viewer of said display, thereby making said seam substantially visually imperceptible to said viewer, notwithstanding any angle at which said display is viewed thereby; and e) means defining a viewing plane comprising a light-transmitting layer disposed adjacent said masking means.

27. The tiled, substantially flat, panel display in accordance with claim 26, further comprising a color filter layer.

28. The tiled, substantially flat, display panel in accordance with claim 26, wherein said masking means comprises light-shielding material disposed in said image source plane for providing additional light collimation along predetermined channels.

29. The tiled, substantially flat, panel display in accordance with claim 26, further comprising:

f) a compound disposed in said seam having optical properties that are substantially similar to the optical properties of said tiles.

30. The tiled, substantially flat, panel display in accordance with claim 29, further comprising:

g) a plurality of focusing devices for coupling light into said image source plane.

31. A tiled, substantially, flat panel composed of a plurality of joined, smaller tiles, display having the characteristic of visually imperceptible seams between tiles disposed in an interior portion thereof, such that said panel display can be viewed as though it were a single, monolithic display, comprising:

a) means defining an image source plane having spaced-apart, pixel-active areas, with each of said pixel-active areas being disposed along said image source plane at a given pitch distance;

b) a plurality of adjacently disposed tiles, each having a predetermined thickness, disposed in a plane adjacent said image source plane;

c) means defining seams disposed between adjacent tiles;

d) a compound disposed in said seams, having optical properties that are substantially similar to the optical properties of said tiles, whereby light passing through said seams is substantially less refracted and/or scattered than in the absence of said compound; and e) means defining a viewing plane for transmitting light from said image source plane to said viewer, with substantially no light from said seams.

32. The tiled, substantially flat, panel display in accordance with claim 31, wherein distance from said image source plane to said viewing plane is within one order of magnitude of said given pitch distance of said spaced-apart, pixel-active areas.

33. The tiled, substantially flat, panel display in accordance with claim 31, wherein said viewing plane comprises a lens layer.

34. The tiled, substantially flat, panel display in accordance with claim 31, wherein said viewing plane comprises a screen layer.

35. The tiled, substantially flat, panel display in accordance with claim 31, further comprising a color filter layer.

36. The tiled, substantially flat, panel display in accordance with claim 31, wherein each of said pixel-active areas comprises a group of primary color elements.

37. The tiled, substantially flat, panel display in accordance with claim 31, wherein said image source plane comprises a substantially non-diverging, light-intensity distribution characteristic.

38. The tiled, substantially flat, panel display in accordance with claim 31, further comprising at least two polarizing layers, one of said polarizing layers being disposed between said image source plane and said viewing plane.

39. The tiled, substantially flat, panel display in accordance with claim 32, wherein said pitch distance of pixel-active areas is greater than approximately 0.2 mm.

40. The tiled, substantially flat, panel display in accordance with claim 32, wherein said distance from said image source plane to said viewing layer is less than approximately five times the thickness of said tiles.

41. The tiled, substantially flat, panel display in accordance with claim 31, further comprising:

f) a compound disposed in said seams having optical properties that are substantially similar to the optical properties of said tiles.

42. A tiled, substantially flat, panel display in a accordance with claim 31, further comprising:

f) a plurality of light-directing means disposed proximate at least one of said planes for eliminating superfluous secondary light paths from said viewing plane.

43. The tiled, substantially flat, panel display in accordance with claim 31, further comprising:

f) a base plate for supporting said planes, said tiles and said masking means, and for providing an electrical, optical and mechanical interface.

44. The tiled, substantially flat, panel display in accordance with claim 43, further comprising:

g) a tile carrier for supporting said tiles.

45. The tiled, substantially flat, panel display in accordance with claim 31, further comprising:

h) a plurality of focusing devices for coupling light into said image source plane.

46. The tiled, substantially flat, panel display in accordance with claim 31, wherein said plurality of focusing devices comprises any one of the group comprising refractive microlenses, off-axis lenses and holographic lens devices.

47. The tiled, substantially flat, panel display in accordance with claim 31, further comprising:

f) a plurality of focusing devices for coupling light in said predetermined collimating channels.

48. The tiled, substantially flat, panel display in accordance with claim 45, wherein said plurality of focusing devices is integrated into said substantially flat, panel display.

49. The tiled, substantially flat, panel display in accordance with claim 31, further comprising an anti-reflective coating.

50. The tiled, substantially flat, panel display in accordance with claim 31, wherein at least one of said pixel-active areas is dimensionally non-identical to the others of said pixel-active areas.

* * * * *